(12) United States Patent
Matsuoka et al.

(10) Patent No.: US 11,275,957 B2
(45) Date of Patent: Mar. 15, 2022

(54) PARKING ASSISTANCE APPARATUS

(71) Applicant: Hitachi Automotive Systems, Ltd., Hitachinaka (JP)

(72) Inventors: Takashi Matsuoka, Hitachinaka (JP); Hiroyuki Kanai, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 241 days.

(21) Appl. No.: 16/612,651

(22) PCT Filed: Jun. 1, 2018

(86) PCT No.: PCT/JP2018/021132
§ 371 (c)(1),
(2) Date: Nov. 11, 2019

(87) PCT Pub. No.: WO2019/012848
PCT Pub. Date: Jan. 17, 2019

(65) Prior Publication Data
US 2020/0094817 A1 Mar. 26, 2020

(30) Foreign Application Priority Data
Jul. 11, 2017 (JP) .............................. JP2017-135320

(51) Int. Cl.
*G06K 9/00* (2006.01)
*B60W 30/06* (2006.01)
(Continued)

(52) U.S. Cl.
CPC ......... *G06K 9/00812* (2013.01); *B60W 30/06* (2013.01); *G08G 1/143* (2013.01);
(Continued)

(58) Field of Classification Search
CPC .... G06K 9/00812; G08G 1/147; G08G 1/168; G08G 1/143; G08G 1/146; B60W 30/06; B60W 2554/00; B60W 2420/42
See application file for complete search history.

(56) References Cited

U.S. PATENT DOCUMENTS 10,583,828 B1 * 3/2020 Han ...................... B60W 30/06
2007/0106440 A1 * 5/2007 Oki ...................... B62D 15/027
701/36
(Continued)

FOREIGN PATENT DOCUMENTS

JP   H10-244890 A   9/1998
JP   2006-129021 A   5/2006
(Continued)

OTHER PUBLICATIONS

International Search Report with English translation and Written Opinion issued in corresponding application No. PCT/JP2018/021132 dated Sep. 25, 2018.

*Primary Examiner* — Dale W Hilgendorf
(74) *Attorney, Agent, or Firm* — Foley & Lardner LLP

(57) ABSTRACT

A parking assistance apparatus is provided that is capable of improving convenience for a driver by determining that parking is possible in a case where the local vehicle will protrude from a parking frame but safety is ensured around a prescribed position that corresponds to the parking frame. The presence/absence of an obstacle around a prescribed position that corresponds to a parking frame is also determined for a parking frame from which the local vehicle will protrude. In a case where safety is ensured around the prescribed position that corresponds to the parking frame, it is determined that parking is possible, and the location of the parking frame is presented to a driver.

10 Claims, 6 Drawing Sheets

(51) Int. Cl.
*G08G 1/14* (2006.01)
*G08G 1/16* (2006.01)

(52) U.S. Cl.
CPC ............. *G08G 1/146* (2013.01); *G08G 1/147* (2013.01); *G08G 1/168* (2013.01); *B60W 2420/42* (2013.01); *B60W 2554/00* (2020.02)

(56) References Cited

U.S. PATENT DOCUMENTS

| | | | | |
|---|---|---|---|---|
| 2009/0174574 | A1* | 7/2009 | Endo | G01S 15/86 340/932.2 |
| 2014/0368636 | A1* | 12/2014 | Lee | G06K 9/00812 348/118 |
| 2015/0039173 | A1* | 2/2015 | Beaurepaire | B62D 15/0285 701/23 |
| 2015/0254981 | A1* | 9/2015 | Tachibana | G06K 9/00812 340/932.2 |
| 2015/0334385 | A1 | 11/2015 | Takemura et al. | |
| 2016/0075329 | A1* | 3/2016 | Tomozawa | B62D 15/0285 701/41 |
| 2016/0280263 | A1* | 9/2016 | Mori | B62D 15/0285 |
| 2017/0028985 | A1* | 2/2017 | Kiyokawa | G01S 15/876 |
| 2017/0132482 | A1* | 5/2017 | Kim | B60K 35/00 |
| 2018/0093664 | A1* | 4/2018 | Kim | B60W 10/20 |
| 2018/0308358 | A1* | 10/2018 | Hayakawa | B62D 15/027 |
| 2018/0308359 | A1* | 10/2018 | Hayakawa | B60W 30/06 |
| 2018/0339700 | A1* | 11/2018 | Lee | G06K 9/00362 |
| 2018/0370566 | A1* | 12/2018 | Kojo | G06K 9/00812 |
| 2019/0073902 | A1* | 3/2019 | Indoh | G08G 1/04 |

FOREIGN PATENT DOCUMENTS

| | | |
|---|---|---|
| JP | 2006-312439 A | 11/2006 |
| JP | 2011-025752 A | 2/2011 |
| JP | 2014-069722 A | 4/2014 |
| JP | 2016-175620 A | 10/2016 |
| JP | 2016-215691 A | 12/2016 |
| WO | WO-2014/007175 A1 | 1/2014 |

* cited by examiner

| No. | ANOTHER-VEHICLE DIFFERENTIAL AMOUNT | MEAN VALUE | NUMBER OF CASES |
|---|---|---|---|
| DETECT FIRST VEHICLE | 30cm | 30 | 1 |
| DETECT SECOND VEHICLE | 60cm | 45 | 2 |
| DETECT THIRD VEHICLE | 0cm | 30 | 3 |
| DETECT FOURTH VEHICLE | 10cm | 25 | 4 |
| DETECT FIFTH VEHICLE | 50cm | 30 | 5 |

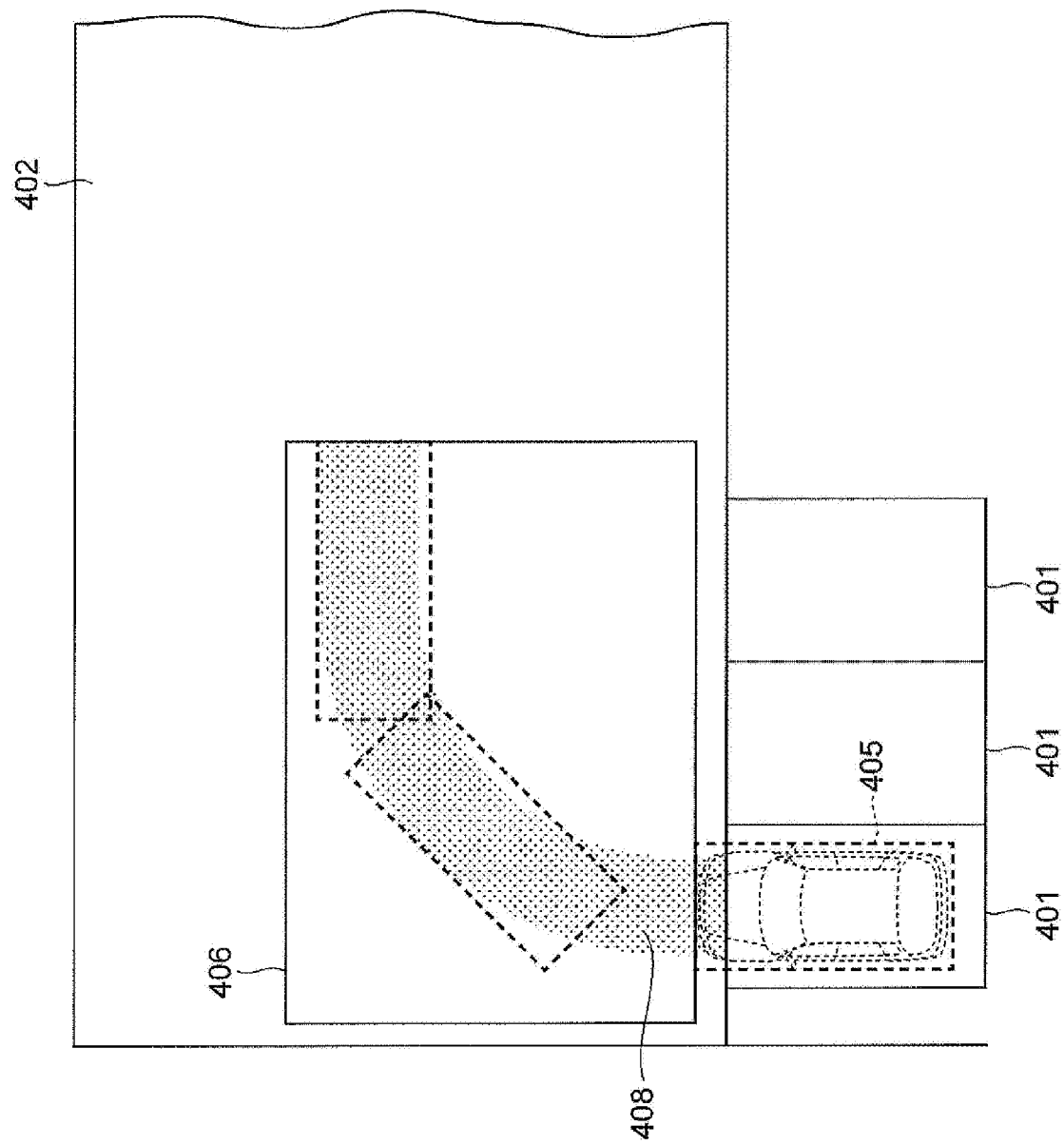

PARKING ASSISTANCE APPARATUS

TECHNICAL FIELD

The present invention relates to a parking assistance apparatus that assists in the entirety or part of a parking operation performed by a driver, and in particular, a parking assistance apparatus that searches for a parking frame and assists in parking of a vehicle.

BACKGROUND ART

One example of an operation having a high degree of difficulty in an operation to drive an automobile is a parking operation. In order to reduce a burden that such a parking operation imposes on a driver, a parking assistance function and an automatic parking function have been provided. These functions cause a variety of operations performed by a driver, such as a brake operation or an accelerator operation to control speed, a steering wheel operation for turning, or a shift operation switch moving forward and reversing, to be automatically performed. In the parking assistance function and the automatic parking function described above, a search for a position available for parking (also referred to as a parking frame) needs to be performed first.

As a method for searching for a position available for parking, PTL 1 listed below has proposed a method for searching for a space available for parking (a parking space) by treating a detection value of a distance sensor as time-series data.

Another example of the method for searching for the position available for parking is a method for detecting the states of parking spaces in forward and backward directions and leftward and rightward directions of a vehicle from a camera video captured by an on-vehicle camera mounted on the vehicle and searching for a parking frame that does not include any other parked vehicle or the like. However, in a conventional technique described in PTL 1, a parking space is searched for by using a detection value of a distance sensor, and therefore, in a parking lot or the like that includes parking frames (parking section lines), a parking space fails to be searched for in consideration of the parking frames.

In view of this, PTL 2 listed below has proposed a method using the detection of a frame line. By employing this conventional technique, in a parking lot or the like that includes parking frames (parking section lines), a parking space can be searched for in consideration of the parking frames. In addition, when the local vehicle is parked inside a parking frame line, the local vehicle can be parked without coming excessively close to an obstacle, such as a vehicle, around a parking frame.

CITATION LIST

Patent Literature

PTL 1: JP 2016-175620 A
PTL 2: JP 2014-069722 A

SUMMARY OF INVENTION

Technical Problem

Meanwhile, in a conventional technique described in PTL 2 listed above or the like, basically, as a premise, the local vehicle is parked in a parking frame detected from a camera video. However, not all of the parking frames of a parking lot or the like have a size that is large enough to include the local vehicle. In addition, even in a case where the size of a parking frame is sufficiently large and the local vehicle can be parked in the parking frame, there is a possibility that the local vehicle will fail to be parked so as to be included in the parking frame due to an influence of a parked vehicle that has been parked in an adjacent parking frame, or an obstacle such as a pole, a car stop, or shrubbery.

For example, in a case where the sizes of all of the parking frames of a parking lot that the local vehicle has entered are smaller than the size of the local vehicle, the parking lot does not have any parking frames in which the local vehicle can be parked. A case is also conceivable where the sizes of parking frames are sufficiently large but only parking frames are available in which an obstacle prevents the local vehicle to be parked. In such a case, in some parking lots, there is a large space around a parking frame, and the local vehicle can be parked without threatening the safety of the surroundings even in a case where the local vehicle is parked so as to slightly protrude from the parking frame.

Stated another way, in the conventional technique described in PTL 2 listed above or the like, consideration is only given to parking in a detected parking frame, and no consideration is given to parking while protruding from a parking frame in a case where safety is ensured. In addition, consideration is only given to controlling a parking position in a lateral direction of a vehicle, and no consideration is given to a parking position in forward/backward direction of the vehicle.

The present invention has been made in view of the circumstances described above, and it is an object of the present invention to provide a parking assistance apparatus that is capable of improving convenience for a driver by determining that parking is possible in a case where the local vehicle will protrude from a parking frame but safety is ensured around a prescribed position that corresponds to the parking frame.

Solution to Problem

In order solve the problem described above, a parking assistance apparatus according to the present invention recognizes a parking frame, and assists n parking of a vehicle in a prescribed position that corresponds to the parking frame that has been recognized. The parking assistance apparatus determines whether it is possible to park the local vehicle in the prescribed position on the basis of a vacancy state around the prescribed position under the assumption that the local vehicle is parked in the prescribed position.

Advantageous Effects of Invention

According to the present invention, in a case where the local vehicle will protrude from a parking frame but safety is ensured around a prescribed position that corresponds to the parking frame, it is determined that parking is possible. Accordingly, in a parking assistance system, the number of candidates for a parking frame available for parking increases in comparison with a conventional technique, and the number of potential parking positions increases. Thus, convenience for the driver is enhanced. In addition, there is an advantage in which, even in a case where the size of parking frames is small in an existing parking lot, the local vehicle can be parked without rewriting the parking frames.

Problems, configurations, and effects that are not described above will be clarified by the Description of Embodiments described below.

BRIEF DESCRIPTION OF DRAWINGS

FIG. 7 is a diagram explaining an example of a method for setting a detection range of an obstacle in a case where a vehicle can only exit in a rightward direction.

DESCRIPTION OF EMBODIMENTS

Embodiments of the present invention are described below with reference to the drawings.

First, a system configuration example of a parking assistance system 1 according to the present invention is described with reference to FIG. 1.

Figure 1:
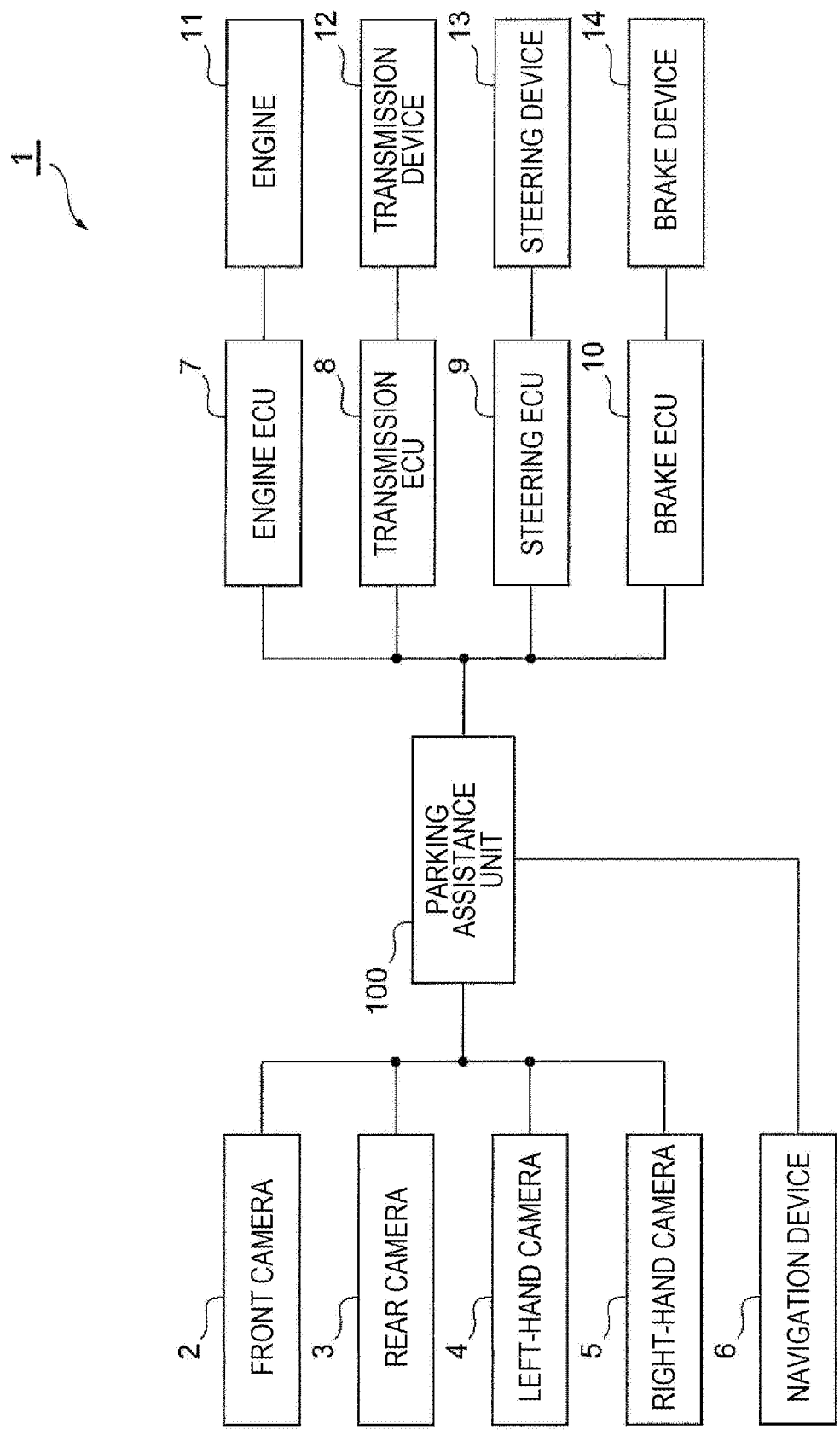
FIG. 1 is a configuration diagram of a parking assistance system according to an embodiment of a parking assistance apparatus (a parking assistance unit) of the present invention.

As illustrated in FIG. 1, the parking assistance system 1 is provided with a plurality of cameras 2 to 5 that detects a parking frame (a line) or a state around the local vehicle, such as an obstacle (in the illustrated example, four cameras that consist of a front camera 2 that photographs the front side of the local vehicle, a rear camera 3 that photographs the rear side of the local vehicle, a left-hand camera 4 that photographs the left-hand side of the local vehicle, and a right-hand camera 5 that photographs the right-hand side of the local vehicle). Camera videos obtained by the cameras 2 to 5 are transmitted to a parking assistance unit (a parking assistance apparatus) 100.

A navigation device 6 has a function of an interface with a driver of the local vehicle on which the parking assistance system 1 is mounted. For example, t navigation device 6 has a function of providing information to the driver through the display of a screen and the output of sound or a function of receiving a command from the driver through an operation performed on a touch panel or the input of sound. This navigation device 6 transmits or receives various types of information to or from the parking assistance unit 100.

In addition, an engine ECU (electronic control unit) 7, a transmission ECU 8, a steering ECU 9, and a brake ECU 10 are mounted, and various actuators of an engine 11 serving as a driving force source, a transmission device 12 that switches moving forward and reversing of a vehicle, a steering device 13 that changes a travelling direction of a vehicle, and a brake device 14 that reduces the speed of a vehicle can be controlled from the parking assistance unit 100.

The engine ECU 7 normally controls an output of the engine 11 that is suitable for an operation performed on an accelerator pedal by a driver. At the time of parking, the engine ECU 7 switches control to control according to a control command from the parking assistance unit 100. The transmission ECU 8 normally controls the switching of a gear to parking, moving forward, or reversing in accordance with an operation performed on a shift lever by a driver. At the time of parking, the transmission ECU 8 switches control to control according to a control command from the parking assistance unit 100. The steering ECU 9 normally controls a travelling direction of the local vehicle that is suitable for an operation performed on a steering wheel by a driver, by changing the orientation of tires. At the time of parking, the steering ECU 9 switches control to control according to a control command from the parking assistance unit 100. The brake ECU 10 normally controls the magnitude of a braking force according to an operation performed on a brake pedal by a driver. At the time of parking, the brake ECU 10 switches control to control according to a control command from the parking assistance unit 100.

Here, a configuration is employed in which the engine 11, the transmission device 12, the steering device 13, and the brake device 14 serving as actuators are automated by being controlled from the parking assistance unit 100. However, a configuration in which only the steering device 13 is automated, a configuration in which a parking brake in addition to four actuators described above is automated, and other configurations are also conceivable.

Figure 2:
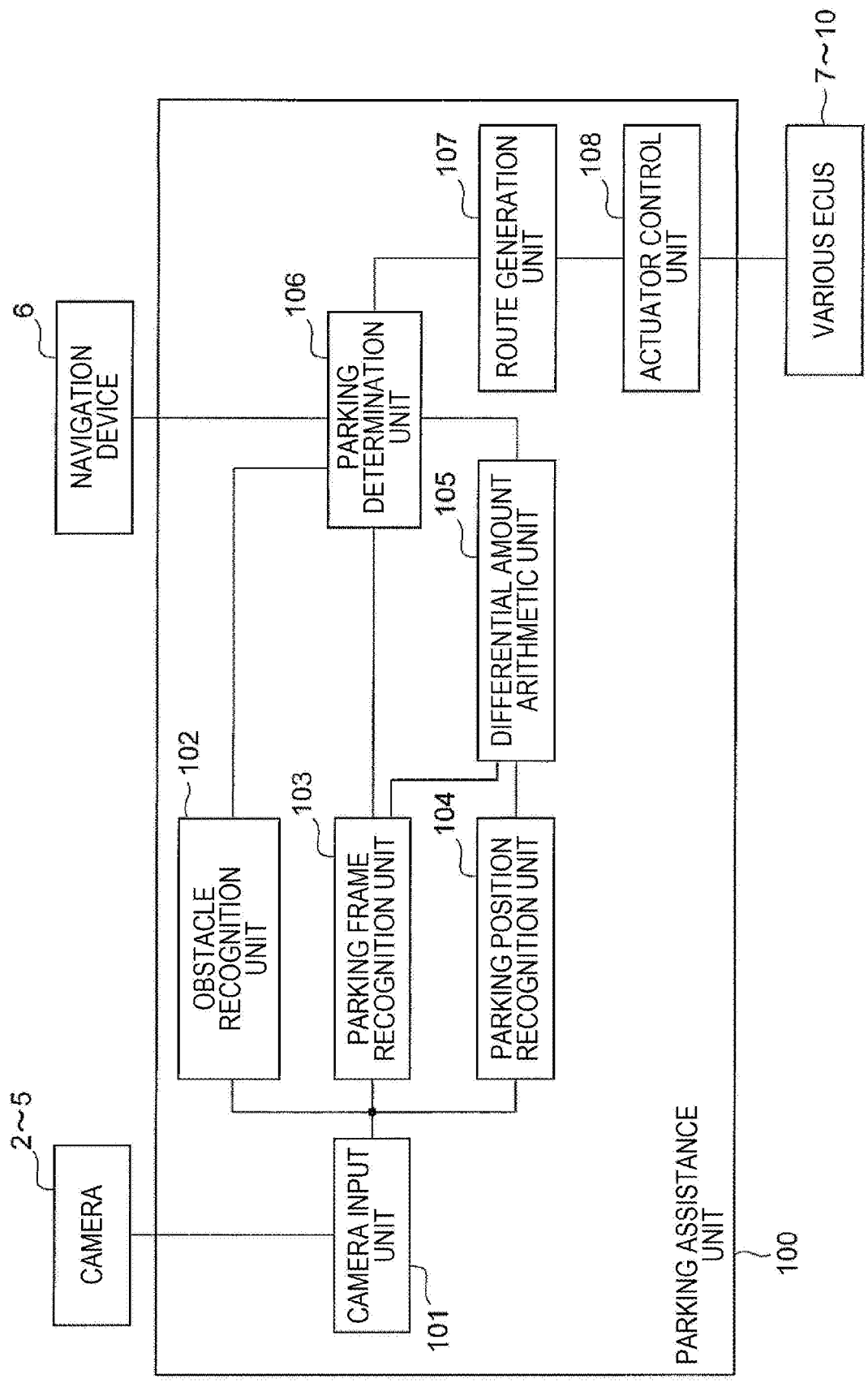
FIG. 2 is a functional block diagram of the parking assistance unit illustrated in FIG. 1.

Next, a functional block of the parking assistance unit 100 illustrated in FIG. 1 is described with reference to FIG. 2. The parking assistance unit 100 is principal configured by a camera input unit 101, an obstacle recognition unit 102, a parking frame recognition unit 103, a parking position recognition unit 104, a differential amount arithmetic unit 105, a parking determination unit 106, a route generation unit 107, and an actuator control unit 108.

The camera input unit 101 serves as a function of taking camera videos obtained by the cameras 2 to 5 into the parking assistance unit 100, and the camera input unit 101 performs interface conversion associated with connection with the cameras 2 to 5, supplies power to the cameras 2 to 5, or detects a failure in the cameras 2 to 5.

The obstacle recognition unit 102 receives video data (camera videos) from the camera input unit 101, and detects an obstacle around the local vehicle. Examples of the obstacle include another vehicle during parking or travelling, a pedestrian, a tree, a wall, and a pole.

The parking frame recognition unit 103 receives video data (camera videos) from the camera input unit 101, and detects a parking frame in the camera videos. This block detects a parking frame in which another vehicle has been parked in addition to a parking frame serving as a parking target of the local vehicle.

Note that an example of a parking frame to be detected is a parking frame for which four peripheral sides are surrounded by a line, but there is also a parking frame that only has lines in boundary portions with vehicles adjacent on left-hand and right-hand sides. In the case of a parking frame that only has left-hand and right-hand lines, range surrounded by quasi-straight lines connecting end points of the respective lines and the left-hand and right-hand lines is considered to be a parking frame.

The parking position recognition unit 104 receives video data (camera videos) from the camera input unit 101, and detects a parking position of another parked vehicle (another vehicle) in the camera videos.

The differential amount arithmetic unit 105 detects an another-vehicle differential amount serving as a distance of a difference (an amount of protrusion) of the parking position of another parked vehicle that has been detected by the parking position recognition unit 104 from the parking frame detected by the parking frame recognition unit 103 (details are described later).

The parking determination unit 106 determines whether the local vehicle can be parked in the parking frame detected by the parking frame recognition unit 103 (specifically, a prescribed position that corresponds to the parking frame) on the basis of respective detection results of the obstacle recognition unit 102, the parking frame recognition unit 103, and the differential amount arithmetic unit 105 and a result of generating a route to a prescribed position that corresponds to a parking frame in the route generation unit 107 (details are described later). In addition, a parking frame that has been determined to be available for parking is displayed on the navigation device 6. In a case where a prescribed position for parking has been determined by a driver performing a selection operation or the like on the navigation device 6, a command to start vehicle control for subsequent parking is issued to the route generation unit 107.

The route generation unit 107 receives an instruction from the parking determination unit 106, generates a control command to be issued to each of the ECUs 7 to 10 by using a generated route to the prescribed position described above, and transmits the control command to the actuator control unit 108.

The actuator control unit 108 transmits the control command from the route generation unit 107 to each of the ECUs 7 to 10, and manages and maintains a communication path.

Figure 3:
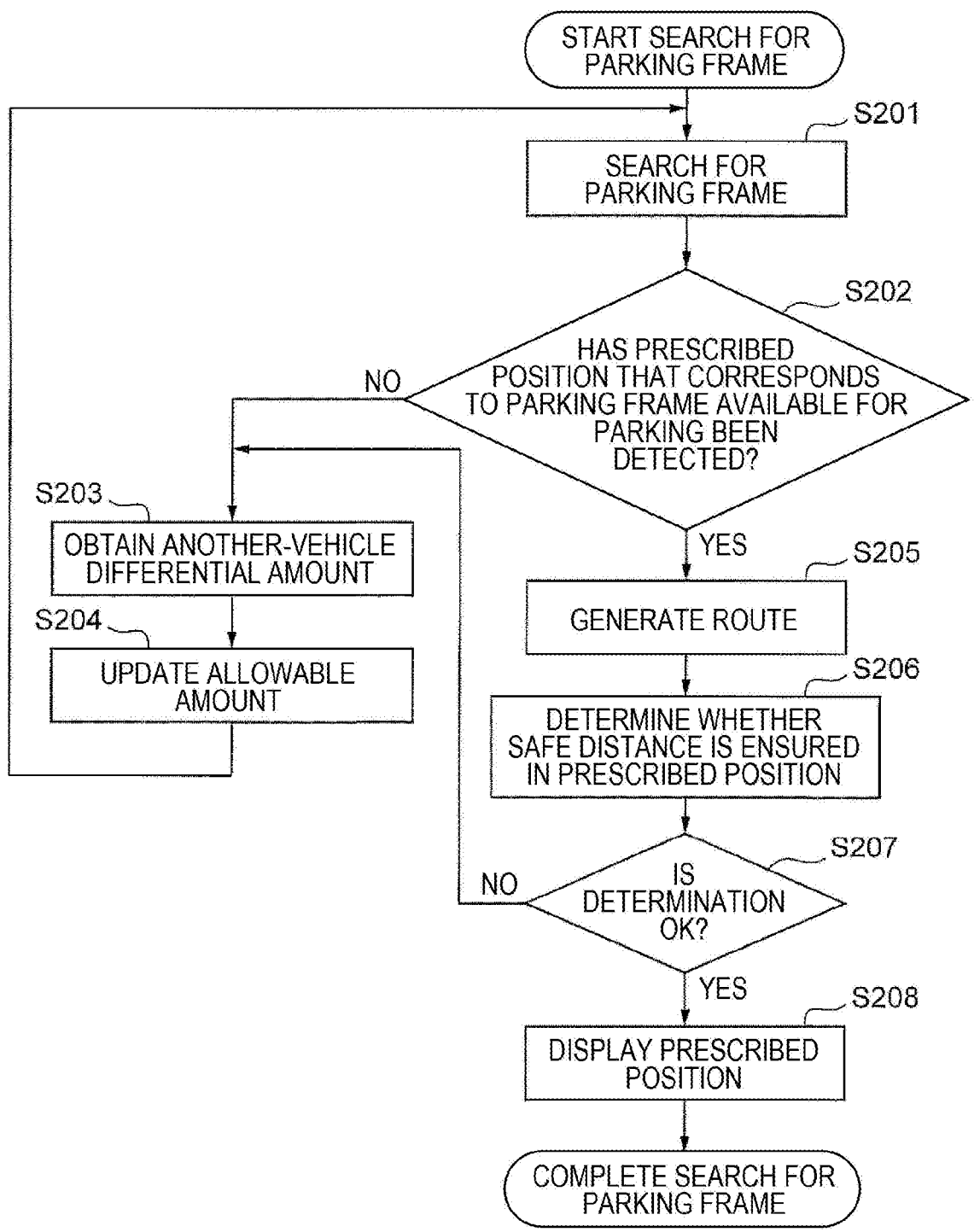
FIG. 3 is a flowchart illustrating the outline of parking assistance control performed by the parking assistance unit illustrated in FIG. 1.

Next, parking assistance control performed by the parking assistance unit 100 illustrated in FIG. 1 and in particular, an operation to search for a parking frame available for parking that is performed by the parking determination unit 106 are described. FIG. 3 is a flowchart explaining parking assistance control performed by the parking assistance unit 100 illustrated in FIG. 1 and in particular, an operation to search for a parking frame available for parking that is performed by the parking determination unit 106.

The content of FIG. 3 is programmed in a computer (not illustrated) of the parking assistance unit 100, and is repeatedly performed in a predetermined cycle.

The parking assistance unit 100 determines that the local vehicle has entered a parking lot provided with parking frames, by detecting an operation that has been performed on a touch panel or the like of the navigation device 6 by a driver of the local vehicle at a timing at which the local vehicle has entered the parking lot, or detecting positional information of the vehicle, so that the present processing (a search for a parking frame) is started. Note that steps S201 to S208 are performed during travelling on a passage in the parking lot in order to search for a position available for parking.

First, in step S201, parking frames from camera videos (parking frames detected by the parking frame recognition unit 103) and the presence/absence of an obstacle (an obstacle detected by the obstacle recognition unit 102) are detected, and a parking frame that does not include an obstacle around the local vehicle is searched for.

In step S202, whether a prescribed position available for parking has been detected from among prescribed positions that correspond to the parking frames is determined on the basis of the positions of the parking frames and the obstacle that have been detected in step S201. In this determination, it is assumed, for example, that a parking section surrounded by a detected parking frame needs to have a size in a width direction (leftward and rightward directions) that is large enough to include the local vehicle, but does not need to have a size in forward and backward directions that is large enough to include the local vehicle. In a case where the parking section does not have a size that is large enough in the forward and backward directions, it is determined whether a local-vehicle differential amount falls within an allowable amount updated in step S204 of the local-vehicle differential amount. In a case where a prescribed position that satisfies such conditions has been detected, the processing moves on to step S205. In contrast, in a case where a prescribed position that satisfies such conditions has not been detected, the processing moves on to step S203.

In step S203, an another-vehicle differential amount (an another-vehicle differential amount calculated by the differential amount arithmetic unit 105) from a parking frame of a parking position of another parked vehicle obtained on the basis of the camera videos (a parking position of another parked vehicle that has been detected by the parking position recognition unit 104) is obtained. At this time, in a case where another vehicle has been parked in a parking frame, the another-vehicle differential amount may be set to 0, and only in a case where another vehicle is protruding from a parking frame, an another-vehicle differential amount according to protrusion may be obtained.

In the present embodiment, a differential amount (the another-vehicle differential amount and the local-vehicle differential amount) means an amount of protrusion of a vehicle from a parking frame at the time of parking the vehicle in the parking frame. For example, as illustrated in FIG. 4, the differential amount means an amount of protrusion (also referred to as a distance of protrusion) 303 (in forward and backward directions) of a parking position 302 of a vehicle from (a frame line of) a parking frame 301 at the time of parking the vehicle in the parking frame 301.

In step S204, an allowable amount of a local-vehicle differential amount (a local-vehicle differential amount of a prescribed position or the local vehicle to be parked in the prescribed position with respect to the parking frame) is calculated (updated) on the basis of the another-vehicle differential amount obtained in step S203. For example, a calculation method is conceivable for accumulating the sum of the obtained another-vehicle differential amounts and the number of obtained cases so as to calculate a mean value of the another-vehicle differential amounts and determining the mean value to be an allowable amount.

An example of a method for calculating an allowable amount from a mean value of another-vehicle differential amounts of parking positions of other parked vehicles that have been detected is described with reference to FIG. 5. In the example illustrated in FIG. 5, a mean value of another-vehicle differential amounts of parking positions of five parked vehicles is calculated, but it is needless to say that this is not restrictive.

Figures 4, 5:
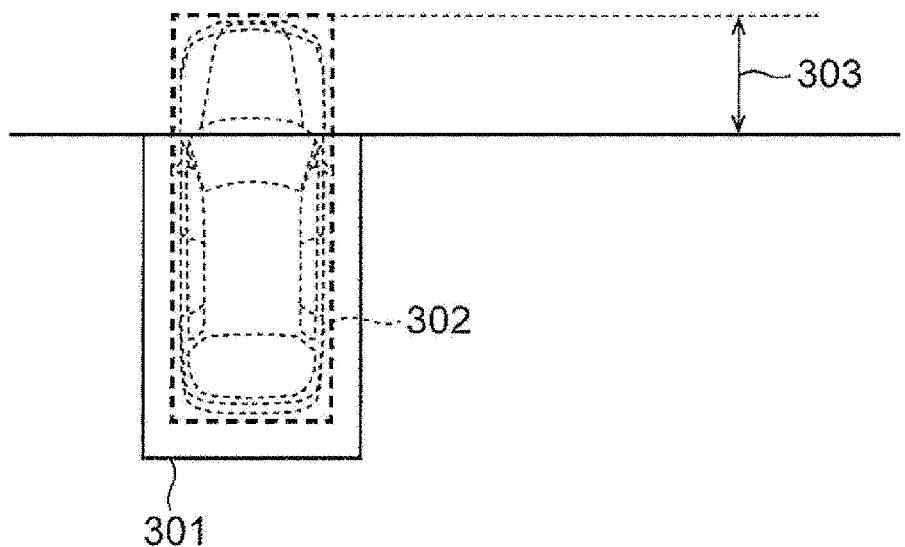
FIG. 4 is a diagram explaining the definition of a differential amount.
FIG. 5 is a diagram explaining an example of a method for calculating an allowable amount.

As illustrated in FIG. 5, in a case where an another-vehicle differential amount of a first vehicle has been detected to be 30 cm, a mean value of 30 and the number of cases of 1 are stored. After this, an arithmetic operation is performed such that mean value after addition of new data=(mean value before addition of new data×number of cases before addition of new data+additional detection value)/number of cases after addition of new data, and the allowable amount is updated. The number of cases is incremented by 1 every time new data is added.

Accordingly, in a case where an another-vehicle differential amount serving as data for a second vehicle has been detected to be 60 cm, calculation is performed by using the calculation formula described above such that a mean value is 45 and the number of cases is 2. After this, similarly, in a case where an another-vehicle differential amount serving as data for a third vehicle has been detected to be 0 cm, an another-vehicle differential amount serving as data for a fourth vehicle has been detected to be 10 cm, and an another-vehicle differential amount serving as data for a fifth vehicle has been detected to be cm, calculation can be performed by using the calculation formula described above such that a mean value and the number of cases at the time of the detection of the third vehicle are 30 and 3, respectively, a mean value and the number of cases at the time of the detection of the fourth vehicle are 25 and 4, respectively, and a mean value and the number of cases at the time of the detection of the fifth vehicle are 30 and 5, respectively.

Then, updating is performed in such a way that the mean value calculated in the calculation described above is the allowable amount of the local-vehicle differential amount. This allowable amount is used in the determination of step S202 described above.

In the example described above, no consideration is given to the parking position of another parked vehicle. However, for example, in a case where parking frames exist on left-hand and right-hand sides of a passage in a parking lot, the allowable value described above is individually stored for the left-hand and right-hand sides, so that an allowable amount according to the state of the surroundings can be set.

In addition, an example in which a mean value is determined to be an allowable amount has been described here, but the allowable amount does not need to be a mean value, and a maximum value, weighting, and the like can be combined.

Further, instead of a method for calculating the allowable amount in the local vehicle, a method for using an allowable amount received from a parking lot or facilities on a road side via wireless communication or a method for specifying a parking lot that the local vehicle has entered by obtaining positional information of the local vehicle vie GPS or the like, and using an allowable amount stored in advance for each of the parking lots in combination with the positional information of the local vehicle, can also be applied. In a case where the allowable amount fails to be obtained via wireless communication or in a case where the positional information of the local vehicle fails to be obtained, an allowable amount that has been stored in advance in the local vehicle or has been calculated in the local vehicle is used.

Furthermore, instead of setting the allowable amount, in a case where a margin distance (a margin distance of the local vehicle from an obstacle detected around the local vehicle at the time of parking the local vehicle) is added to the size of the local vehicle when it is determined whether the local vehicle will be included within a parking frame or a prescribed position that corresponds to the parking frame, the margin distance is changed according to the presence/absence of an obstacle around the parking frame or the prescribed position, or the type of the obstacle. For example, in a case where there are no obstacles around the parking frame or the prescribed position, the margin distance is set to 0. Alternatively, in a case where there is an object, such as shrubbery, that is soft enough to not damage the local vehicle if the object comes into contact with the local vehicle, setting is performed in such a way that the margin distance is reduced. Thus, a prescribed position available for parking can be detected more easily and widely.

Returning now to FIG. 3, the process of step S205 is a process performed in a case where a prescribed position available for parking has been detected in the determination of step S202. In this step S205, the route generation unit 107 generates a route (also referred to as a parking route) to the prescribed position that has been detected, on the basis of the current position of the local vehicle, the orientation of the local vehicle, and the like. At this time, in a case where a route to the prescribed position fails be generated, the prescribed position is not presented to a driver.

Next, in step S206, under the assumption that the local vehicle is parked in the prescribed position, a vacancy state (a vacancy state for ensuring safety distance) around the prescribed position (for example, in front of the prescribed position) is determined from camera videos. Specifically, it is determined whether there is an obstacle within a given range (a detection range) around the prescribed position (for example, in front of the prescribe position). In addition to this, it is also determined whether there is an obstacle within a prescribed range (normally, a range included in the detection range) from the route (a route from the current position of the local vehicle to the prescribed position) that has been generated (by the route generation unit 107) in step S205.

An example of a method for setting a detection range when it is determined in step S206 whether there is an obstacle within a given range (the detection range) around the prescribed position (for example, in front of the prescribed position) is described.

Figure 6:
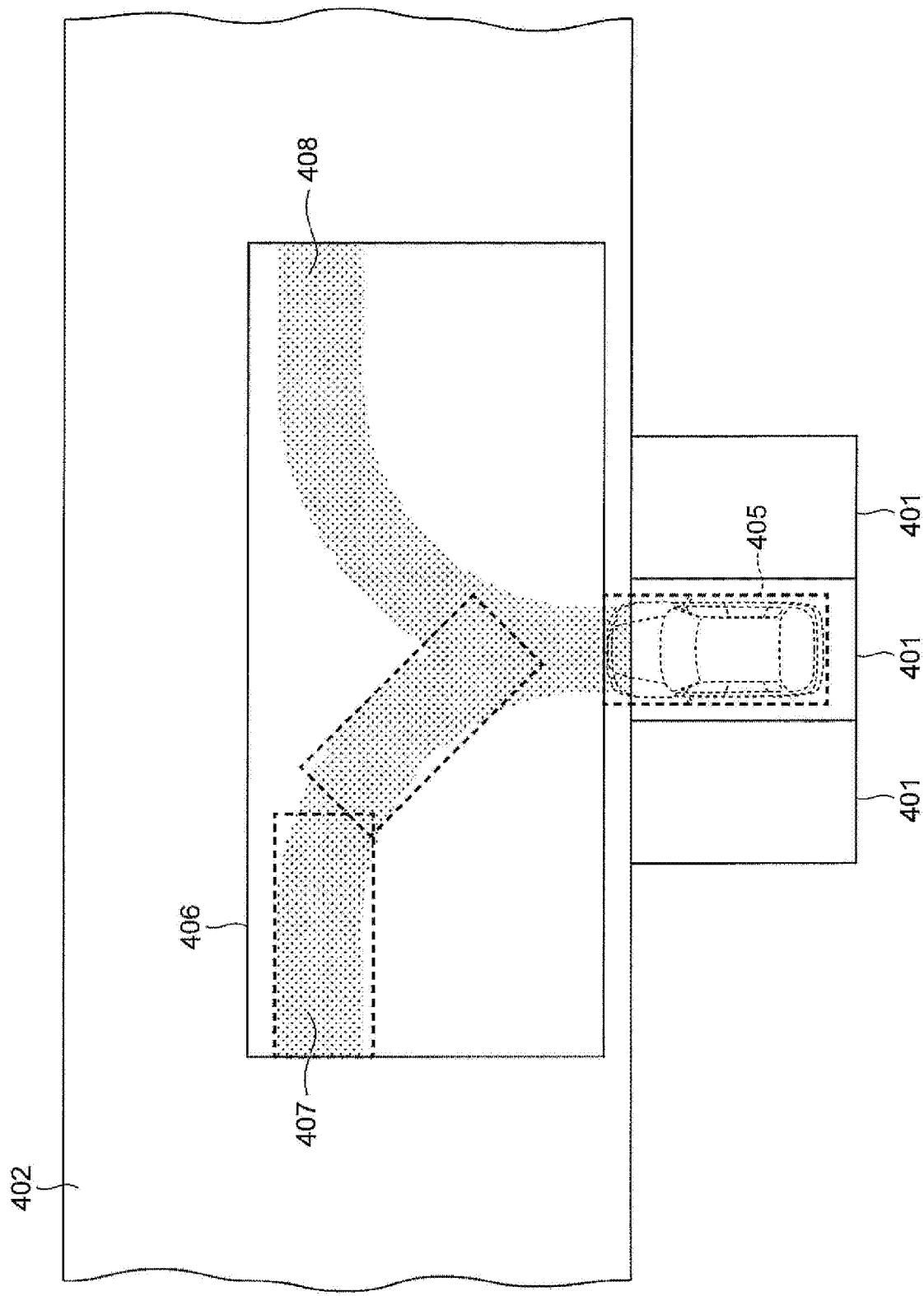
FIG. 6 is a diagram explaining an example of a method for setting a detection range of an obstacle in a case where a vehicle can exit in both a leftward direction and a rightward direction.

FIG. 6 is an example of a detection range of an obstacle in consideration of exiting. For example, as illustrated in FIG. 6, it is assumed that a parking lot has a configuration in which there are three parking frames 401 and a passage 402 in the parking lot extends in a lateral direction in front of the three parking frames 401. In a case where a parking position 405 is determined to be a prescribed position, it is detected in step S206 whether there is an obstacle in a detection range 406 that has been set in front of the parking position 405. It is assumed, for example, that this detection range 406 is a rectangular range required for the exiting of the local vehicle. An exiting route 407 is a route in the case of exiting in a leftward direction, and an exiting route 408 is a route in the case of exiting in a rightward direction. As described above, the size of the detection range 406 can be determined according to the turning performance of the local vehicle.

FIG. 7 is another example of a detection range of an obstacle in consideration of exiting. For example, as illustrated in FIG. 7, it is assumed that a parking lot has a configuration in which there are three parking frames 401 and there is a passage 402 in the parking lot in front of the three parking frames 401 but this passage 402 terminates on one side. In a case where a parking position 405 is determined to be a prescribed position, it is detected in step S206 whether there is an obstacle in a detection range 406 that has been set in front of the parking position 405. Similarly to the case of FIG. 6, it is assumed, for example, that this detection range 406 is a rectangular range required for the exiting of the local vehicle. However, in this example of FIG. 7, a vehicle fails to exit in a leftward direction, and therefore it is sufficient if consideration is only given to an exiting route 408 in a rightward direction. Similarly, the size of the detection range 406 can be determined according to the turning performance of the local vehicle. However, in a case where there is an area where the presence/absence of an obstacle does not need to be determined, the detection range can be narrowed, and this enables a reduction in a processing load.

In the examples illustrated in FIGS. 6 and 7, a rectangle in consideration of an exiting route of the local vehicle has been described as an example of setting a detection range of an obstacle, but the detection range does not need to be limited to a rectangle. In addition, in the example of setting, the detection range is determined on a condition in which the wheel is not cut at the time of exiting, but on a condition in which the wheel is cut at the time of exiting, the detection range can be narrowed.

When the detection range is narrowed, there is a higher probability of being determined to be a prescribed position available for parking. Therefore, it is desirable that the detection range be made as narrow as possible.

Further, instead of a method for calculating the size of the detection range in the local vehicle, a method for using a detection range received from a parking lot or facilities on a road side via wireless communication or a method for specifying a parking lot that the local vehicle has entered by obtaining positional information of the local vehicle vie GPS or the like, and using a detection range stored in advance for each of the parking lots in combination with the positional information of the local vehicle, can also be applied. In a case where the detection range fails to be obtained via wireless communication or in a case where the positional information of the local vehicle fails to be obtained, a detection range that has been stored in advance in the local vehicle or has been calculated in the local vehicle is used.

Returning again to FIG. 3, in step S207, in a case where it is determined that there are no obstacles within a given range (the detection range) (stated another way, the determination is OK) on the basis of the determination result of step S206, the processing moves on to step S208. This is a case where, in a case where the local vehicle is parked in a prescribed position that corresponds to the detected parking frame, the local-vehicle differential amount falls within an allowable amount, there are no obstacles within a given range, and this enables safe parking. In contrast, in a case where it is determined that there is an obstacle within a given range (stated another way, the determination is NG), it is determined that there is no vacant region around the prescribed position (for example, in front of the prescribed position) and the prescribed position is not available for parking, the processing moves on to step S203, and a search for a prescribed position available for parking is continued.

In step S208, a prescribed position available for safe parking is presented to a driver via the navigation device 6. In a case where the prescribed position that has been detected is displayed on a navigation screen of the navigation device 6 in a state where a frame line or hatching is superimposed onto camera videos obtained from the cameras 2 to 5, it is desirable that a local-vehicle differential amount from the parking frame be displayed with a numerical display, a frame line, or the color and pattern of hatching, and be reported to the driver. The driver can recognize, due to the presentation of the prescribed position, that there are not obstacles within a given range or a difference from the parking frame (the local-vehicle differential amount) falls within an allowable amount. However, it is appropriate for safe parking that there be as few obstacles as possible around the prescribed position and the local-vehicle differential amount be as small as possible. Therefore, in particular, in a case where a plurality of candidates for a prescribed position is presented simultaneously, the configuration described above is useful as information for making determination when a driver selects a frame serving as a parking target.

Next, the outline of processing after a prescribed position that corresponds to a parking frame available for safe parking has been determined by a driver performing a selection operation or the like on the navigation device 6 is described.

As described above, after a prescribed position has been determined, the parking assistance unit 100 transmits a control command to the engine ECU 7, the transmission ECU 8, the steering ECU 9, or the brake ECU 10 (from the actuator control unit 108), so that the local vehicle is moved to the prescribed position that has been determined. In some cases, after the movement of the local vehicle has been started, a state that has failed to be detected at the time of a search for the prescribed position is detected during the movement of the vehicle to the prescribed position, or a state changes during the movement of the vehicle to the prescribed position. Examples include a case where there is another obstacle behind an obstacle that does not affect parking determination, and a case where another vehicle to be parked has been parked in a position that affects the determination of whether parking is possible, during the movement of the local vehicle. In these cases, if parking is continued, a vehicle is parked in a parking position in a state where safety is not ensured, and this needs to be avoided.

Accordingly, even during the movement of a vehicle to a prescribed position that has been determined, it continues being determined whether there is an obstacle within a given range around the vehicle (for example, in front of the vehicle) in a case where the vehicle is parked in the prescribed position. In addition, a difference of the local vehicle from the parking frame in a case where the local vehicle is parked in the prescribed position also continues being determined. During travelling until a stop in the prescribed position, if it continues being determined that parking is possible, movement for parking in the prescribed position is continued. In contrast, during the movement of a vehicle for parking, in a case where it has been determined that parking is impossible, parking in the prescribed position is stopped. At this time, before it is determined that parking is impossible, it is conceivable that standby is performed during a given time period after the detection of an obstacle or the like so that the resolution of circumstances is awaited, or that it is confirmed with a driver whether parking in the prescribed position that has been determined will be cancelled. In confirmation with the driver, a report using a screen display or sound in the navigation device 6 is used. In addition, a report using the vibration or the like of a steering wheel or a seat can also be used.

In a case where it has been determined that parking is impossible, for example, the local vehicle is returned to a point at which movement to the parking frame has been started, and a search for a prescribed position that corresponds to a parking frame available for safe parking is started again.

In the description above, a configuration has been employed in which consideration is given to a detection range of an obstacle or a differential amount from a parking frame principally in forward and backward directions of the local vehicle. However, the forward and backward directions are not restrictive, and it is needless to describe in detail that a configuration can be employed in which consideration is given to leftward and rightward directions (in other words, sides) of the vehicle.

In the present embodiment, the precision of the detection of a parking frame available for parking is determined according to the performance of the detection of a parking frame of a camera or the like. However, in a case where a camera is used, a camera lens is attached, for example, to the outside of a vehicle. Therefore, there is a possibility that a lens surface of the camera lens will be covered with raindrops or mud during travelling. At this time, there is a possibility that an error will be generated between a detection value of a distance that has been obtained by the camera and an actual value. Therefore, in a case where dirt has been detected on the lens surface (stated another way, in the case of the deterioration of the recognition performance of a camera serving as a recognition means for recognizing the surroundings of the local vehicle), a standard of determining whether parking in the prescribed position is possible, such as a detection range of the detection of an obstacle in front of a parking position (see FIGS. 6 and 7), an allowable amount of a difference from a parking frame, or a margin distance of the size of a vehicle, is switched to a standard that is different from a normal standard (a normal value). For example, a threshold in a determination standard that is smaller than a threshold in the normal standard (the normal value) is returned to the threshold in the normal standard (the normal value). This enables a reduction in a probability of the occurrence of collision or the like at the time of the generation of an error of the detection of a distance.

In a case where dirt or the like is stuck onto the lens surface, a differential amount of a camera video at each time is reduced even in a case where a vehicle is travelling. Therefore, by detecting the differential amount of the camera video, the recognition performance of a camera serving as a recognition means for recognizing the surroundings of the local vehicle can be determined. A ratio of the number of pixels that have no difference at each time is detected, and in a case where pixels that have no difference exist at a given ratio or more, switching is performed in such a way that the normal standard (threshold) is used. Only one threshold does not need to be used, but it can be considered that the threshold is made closer to the normal value by using a plurality of thresholds.

In a parking lot, there is a possibility that a camera video that has no difference will be obtained due to a large wall having a single color, or the like, even when dirt is not stuck to the lens surface. Therefore, it is desirable that this determination be performed before entering the parking lot. In addition, in a case where it has been detected that dirt is stuck to the lens surface, it can also be considered that this detection is reported to a driver so that the driver removes the dirt.

By employing the configuration described above, in the parking assistance unit (the parking assistance apparatus) 100 according to the present embodiment, the presence/absence of an obstacle around a prescribed position that corresponds to a parking frame is also determined for a parking frame from which the local vehicle will protrude. In a case where safety is ensured around the prescribed position that corresponds to the parking frame, it is determined that parking is possible. Accordingly, in parking assistance system, a larger number of candidates for a parking frame available for parking are presented to a driver in comparison with a conventional technique, and the number of potential parking positions increases. Thus, convenience for the driver is enhanced. In addition, there is an advantage in which, even in a case where the size of parking frames is small in an existing parking lot, the local vehicle can be parked without rewriting the parking frames.

Further, in addition to the ensuring of safety around the prescribed position, an allowable amount of a difference (a local-vehicle differential amount) from a parking frame at the time of parking in the prescribed position is calculated, and it is also determined that parking is possible in a case where the local-vehicle differential amount falls within the allowable amount (in other words, in a case where the local-vehicle differential amount does not exceed the allowable amount, it is determined that parking in the prescribed position is possible, and in a case where the local-vehicle differential amount exceeds the allowable amount, it is determined that parking in the prescribed position is impossible). This also results in an increase in the number of candidates for a parking frame available for paring that will be presented to a driver, and therefore convenience for the driver can be further enhanced.

Note that the present invention is not limited to the embodiment described above, and includes various variations. For example, the embodiment above has been descried in detail in order to make the present invention easily understandable, and the present invention is not necessarily limited to an embodiment that has all of the described configurations.

In addition, some or all of respective configurations, functions, processing units, processing means, and the like that are described above may be implemented by hardware by being designed using, for example, an integrated circuit. Further, the respective configurations, functions, and the like that are described above may be implemented by software by a processor analyzing and executing a program for achieving the respective functions. A program for achieving the respective functions, a table, or information such as a file can be stored in a storage device such as a memory, a hard disk, or a solid state drive (SSD), or a recording medium such as an IC card, an SD card or a DVD.

Furthermore, control lines or information lines that are considered to be necessary in description have been indicated, and not all of the control lines or information lines are indicated on a product. In practice, almost all of the configurations may be considered to be connected to each other.

REFERENCE SIGNS LIST 1 parking assistance system
2 front camera
3 rear camera
4 left-hand camera
5 right-hand camera
6 navigation device
7 engine ECU
8 transmission ECU
9 steering ECU
10 brake ECU
11 engine
12 transmission device
13 steering device
14 brake device
100 parking assistance unit (parking assistance apparatus)
101 camera input unit
102 obstacle recognition unit
103 parking frame recognition unit
104 parking position recognition unit
105 differential amount arithmetic unit
106 parking determination unit
107 route generation unit
108 actuator control unit

The invention claimed is:

1. A parking assistance apparatus configured to recognize a parking frame and assist in parking of a vehicle in a prescribed position that corresponds to the parking frame that has been recognized, wherein
the apparatus is configured to determine whether it is possible to park a local vehicle in the prescribed position based on a vacancy state around the prescribed position under a condition that the local vehicle will attempt to be parked in the prescribed position, the apparatus configured to control an engine of the local vehicle to actuate parking of the local vehicle,
wherein the vacancy state provides a safe distance around the prescribed position,
wherein the prescribed position includes a local vehicle protrusion extending beyond the parking frame in a forward direction of the local vehicle, and
wherein, in a case where a recognition performance of a camera configured to recognize surroundings of the local vehicle has deteriorated, the parking assistance apparatus is configured to switch a standard of determining whether parking in the prescribed position is possible to a standard that is different from a normal standard.

2. The parking assistance apparatus according to claim 1, wherein the apparatus is configured to determine whether it is possible to park the local vehicle in the prescribed position based on a presence or absence of an obstacle within a detection range that has been set around the prescribed position.

3. The parking assistance apparatus according to claim 2, wherein the detection range is set on at least one of a front side, a rear side, and sides of the prescribed position.

4. The parking assistance apparatus according to claim 1, wherein
the apparatus is configured to:
recognize a parking position of another vehicle that has been parked around the prescribed position, and calculate an another-vehicle differential amount of the parking position of the another vehicle with respect to the parking frame,
calculate a local-vehicle differential amount of the prescribed position of the local vehicle to be parked in the prescribed position with respect to the parking frame, and
determine whether it is possible to park the local vehicle in the prescribed position based on the another-vehicle differential amount and the local-vehicle differential amount in addition to the vacancy state around the prescribed position.

5. The parking assistance apparatus according to claim 4, wherein, the parking assistance apparatus is configured to, when the local-vehicle differential amount exceeds an allowable amount that is calculated from the another-vehicle differential amount, determine that parking in the prescribed position is impossible.

6. The parking assistance apparatus according to claim 5, wherein the allowable amount is stored for each parking lot provided with the parking frame in combination with positional information of the local vehicle.

7. The parking assistance apparatus according to claim 1, wherein, the parking assistance apparatus is configured to, in determining whether parking in the prescribed position is possible, change a margin distance of the local vehicle from an obstacle around the prescribed position at a time of parking the local vehicle in the prescribed position according to a type of the obstacle.

8. The parking assistance apparatus according to claim 1, wherein the parking assistance apparatus is configured to report to a driver a local-vehicle differential amount of the prescribed position of the local vehicle to be parked in the prescribed position with respect to the parking frame, together with the prescribed position that has been determined to be available for parking.

9. The parking assistance apparatus according to claim 1, wherein the parking assistance apparatus is configured determine the vacancy state around the prescribed position according to a vehicle performance of the local vehicle, the vacancy state being used to determine that parking is possible.

10. The parking assistance apparatus according to claim 9, wherein the parking assistance apparatus is configured to change a detection range that has been set around the prescribed position to a range that corresponds to the vehicle performance of the local vehicle, the detection range being used to determine that parking is possible.

* * * * *